US011390117B2

(12) United States Patent
Watanabe et al.

(10) Patent No.: US 11,390,117 B2
(45) Date of Patent: Jul. 19, 2022

(54) TIRE COMPRISING A RUBBER COMPOSITION

(71) Applicant: COMPAGNIE GENERALE DES ETABLISSEMENTS MICHELIN, Clermont-Ferrand (FR)

(72) Inventors: Makiko Watanabe, Tokyo (JP); Hiroko Fukasawa, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 219 days.

(21) Appl. No.: 16/482,380

(22) PCT Filed: Jan. 31, 2018

(86) PCT No.: PCT/JP2018/003065
§ 371 (c)(1),
(2) Date: Jul. 31, 2019

(87) PCT Pub. No.: WO2018/143223
PCT Pub. Date: Aug. 9, 2018

(65) Prior Publication Data
US 2020/0001650 A1  Jan. 2, 2020

(30) Foreign Application Priority Data
Jan. 31, 2017 (JP) .................. PCT/JP2017/003291

(51) Int. Cl.
*C08K 3/013* (2018.01)
*C08C 19/22* (2006.01)
*B60C 1/00* (2006.01)
*C08C 19/25* (2006.01)
*C08L 9/06* (2006.01)
C08K 3/04 (2006.01)
C08K 3/36 (2006.01)
C08K 5/00 (2006.01)

(52) U.S. Cl.
CPC ............ *B60C 1/0016* (2013.01); *C08C 19/22* (2013.01); *C08C 19/25* (2013.01); *C08K 3/013* (2018.01); *C08L 9/06* (2013.01); C08F 2800/20 (2013.01); C08K 3/04 (2013.01); C08K 3/36 (2013.01); C08K 5/0016 (2013.01); C08L 2205/03 (2013.01)

(58) Field of Classification Search
None
See application file for complete search history.

(56) References Cited
U.S. PATENT DOCUMENTS

| 5,830,930 | A | 11/1998 | Mahmud et al. |
|---|---|---|---|
| 6,013,718 | A | 1/2000 | Cabioch et al. |
| 6,414,061 | B1 | 7/2002 | Cruse et al. |
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 7,250,463 | B2 | 7/2007 | Durel et al. |
| 7,300,970 | B2 | 11/2007 | Durel et al. |
| 7,488,768 | B2 | 2/2009 | Tardivat et al. |
| 7,491,767 | B2 | 2/2009 | Durel et al. |
| 8,492,475 | B2 | 7/2013 | Araujo Da Silva et al. |
| 8,800,621 | B2 | 8/2014 | Miyazaki |
| 8,957,155 | B2 | 2/2015 | Seeboth et al. |
| 9,010,393 | B2 | 4/2015 | Araujo Da Silva et al. |
| 9,061,548 | B2 | 6/2015 | Miyazaki |
| 9,175,124 | B2 | 11/2015 | Chaboche et al. |
| 2002/0148545 | A1 | 10/2002 | Nanni et al. |
| 2004/0051210 | A1 | 3/2004 | Tardivat et al. |
| 2004/0129360 | A1 | 7/2004 | Vidal |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2005/0245753 | A1 | 11/2005 | Cruse et al. |
| 2007/0228322 | A1 | 10/2007 | Chaves et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2010/0099795 | A1 | 4/2010 | Uesaka |
| 2010/0099810 | A1 | 4/2010 | Nishioka |
| 2010/0105826 | A1 | 4/2010 | Uesaka |
| 2010/0108213 | A1* | 5/2010 | Miyazaki ............. B60C 1/0041 152/209.5 |
| 2010/0145089 | A1 | 6/2010 | Mignani et al. |
| 2011/0152458 | A1 | 6/2011 | Araujo Da Silva et al. |
| 2011/0178233 | A1* | 7/2011 | Chaboche ............. C08L 53/025 524/571 |
| 2011/0294953 | A1* | 12/2011 | Seeboth ................ C07F 7/1804 525/102 |
| 2012/0024441 | A1* | 2/2012 | Ryba ........................ C08L 15/00 152/209.5 |
| 2012/0267026 | A1* | 10/2012 | Miyazaki .................. C08L 7/00 152/537 |
| 2013/0267640 | A1* | 10/2013 | Lopez .................... F24S 25/634 524/322 |
| 2014/0187707 | A1 | 7/2014 | Okabe et al. |
| 2014/0206793 | A1 | 7/2014 | Okabe et al. |

(Continued)

FOREIGN PATENT DOCUMENTS

EP  0 778 311 A1  6/1997
EP  2 285 852      2/2011

(Continued)

OTHER PUBLICATIONS

International Search Report and Written Opinion dated Apr. 17, 2018, in corresponding PCT/JP2018/003065 (13 pages).

(Continued)

*Primary Examiner* — Peter A Salamon
(74) *Attorney, Agent, or Firm* — Venable LLP

(57) ABSTRACT

A tire comprises a rubber composition based on at least an elastomer matrix comprising 20 to 70 phr of a first diene elastomer bearing at least one SiOR function, R being a hydrogen atom or a hydrocarbon radical, the SiOR function not located at the chain ends of the first diene elastomer, 20 to 70 phr of a second diene elastomer which is a polyisoprene, and optionally, 0 to 20 phr of a third diene elastomer; and a reinforcing filler comprising a reinforcing inorganic filler.

14 Claims, No Drawings

(56) References Cited

U.S. PATENT DOCUMENTS

| | | | | |
|---|---|---|---|---|
| 2014/0350138 | A1* | 11/2014 | Cladiere | B60C 1/0016 |
| | | | | 523/156 |
| 2016/0009875 | A1* | 1/2016 | Kawai | C08F 16/34 |
| | | | | 524/575.5 |
| 2016/0159157 | A1* | 6/2016 | Jacoby | B60C 1/0016 |
| | | | | 152/450 |
| 2016/0176992 | A1* | 6/2016 | Dire | C08F 236/10 |
| | | | | 524/572 |
| 2016/0280806 | A1 | 9/2016 | Dire et al. | |
| 2016/0297954 | A1* | 10/2016 | Sakaki | C08L 9/06 |
| 2016/0319045 | A1* | 11/2016 | Dire | C08C 19/44 |
| 2017/0204256 | A1* | 7/2017 | Labrunie | C08C 19/12 |
| 2018/0001702 | A1 | 1/2018 | Chatard et al. | |
| 2020/0001650 | A1* | 1/2020 | Watanabe | C08L 9/00 |
| 2021/0101409 | A1 | 4/2021 | Watanabe et al. | |

FOREIGN PATENT DOCUMENTS

| | | |
|---|---|---|
| EP | 2366557 A1 | 9/2011 |
| EP | 2412544 A1 | 2/2012 |
| EP | 3031620 A1 | 6/2016 |
| JP | 2005-320371 A | 11/2005 |
| JP | 2007-126523 A | 5/2007 |
| JP | 2010-111753 A | 5/2010 |
| JP | 2013-124328 A | 6/2013 |
| JP | 2013-177632 A | 9/2013 |
| JP | 2015-929 A | 1/2015 |
| JP | 2015-7153 A | 1/2015 |
| JP | 2015-196760 A | 11/2015 |
| JP | 2016-6153 A | 1/2016 |
| JP | 2016-44270 A | 4/2016 |
| WO | 96/37547 A2 | 11/1996 |
| WO | 99/09036 A1 | 2/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2004/033548 A1 | 4/2004 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | 2015/185394 A1 | 12/2015 |
| WO | 2016/102344 A1 | 6/2016 |
| WO | 2016/140217 A1 | 9/2016 |

OTHER PUBLICATIONS

International Search Report and Written Opinion dated Apr. 12, 2017, in corresponding PCT/JP2017/003291 (10 pages).

Exxon Mobil: "Data Sheet: Escorez (tm) 5600 Tackifying Resin", exxonmobilchemical.com, pp. 1-2, XP002780170, retrieved from internet URL: https://exxonmobilchemical.ides.com/en-US/ds243787/Escorez%E2%84%A2%205600.aspx?I=297068U=1 (2017).

Co-Pending U.S. Appl. No. 16/499,693, filed Sep. 30, 2019 (available on USPTO system).

S. Brunauer, et al., "Adsorption of Gases in Multimolecular Layers", J. Am. Chem. Soc., vol. 60, pp. 309-319 (1938).

* cited by examiner

TIRE COMPRISING A RUBBER COMPOSITION

TECHNICAL FIELD

The field of the invention is that of rubber composition(s) for tire(s) exhibiting good tack before curing.

BACKGROUND ART

The ability of rubber compositions to be tacky before curing is an important property to the tire building. Indeed, for making tires, it is necessary to be able to apply the different layers of the tire on each other and that these layers stick to each other before curing of the tire, curing which will associate for crosslinking the each layers to others. This property of tack of the composition before curing (vulcanization), is also called "tackiness" or "uncured tack" or "unvulcanized tack" or "green tack".

The recent developments of low rolling resistance tires have brought the industrials of tires to substantially modify the rubber compositions of their tires, for example, to make the rubber compositions based on a functional diene elastomer. It is generally said that such a modification has a drawback which is the diminution of tack of rubber compositions before curing, and the drawback can degrade the processability of tires.

CITATION LIST

Patent Literature

PTL 1: WO2016/102344

The patent application (Patent literature 1), discloses a tire that comprises a rubber composition comprising a specific hydrocarbon resin to improve the tack of rubber compositions before curing.

A constant objective of tire manufacturers is improvement of tack of rubber compositions of tires before curing.

SUMMARY OF INVENTION

Technical Problem

Now, during their research, the inventors have discovered that a specific rubber composition for a tire makes it possible to unexpectedly improve the tack of the rubber composition(s) of the tire(s).

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

Solution to Problem

A first aspect of the invention is a tire comprising a rubber composition based on at least:
  an elastomer matrix comprising 20 to 70 phr, preferably 20 to 60 phr, more preferably 20 to 50 phr, of a first diene elastomer bearing at least one SiOR function, R being a hydrogen atom or a hydrocarbon radical, the SiOR function not located at the chain ends of the first diene elastomer, 20 to 70 phr, preferably 20 to 60 phr, more preferably 20 to 50 phr, of a second diene elastomer which is a polyisoprene, and optionally, 0 to 20 phr, preferably 0 to 15 phr, of a third diene elastomer; and
  a reinforcing filler predominantly comprising a reinforcing inorganic filler.

Advantageous Effects of Invention

The rubber composition of the tire makes it possible to improve the tack of the rubber composition(s) of the tire(s).

DESCRIPTION OF EMBODIMENTS

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The diene elastomer system of an elastomer matrix according to the invention comprises at least a first diene elastomer, a second diene elastomer and optionally a third diene elastomer as detailed below.

The first diene elastomer may be selected from the group consisting of polybutadienes (BRs), synthetic polyisoprenes (IRs), natural rubber (NR), butadiene copolymers, isoprene copolymers and the mixtures thereof; such copolymers are selected more preferably from the group consisting of styrene-butadiene copolymers (SBRs), isoprene-styrene copolymers (SIRs) and the mixtures thereof. More preferably, the first diene elastomer is a styrene-butadiene copolymer (SBR).

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution.

The first diene elastomer bears at least one SiOR function, R being a hydrogen atom or a hydrocarbon radical.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

The SiOR function borne by the first diene elastomer is not located at the chain ends of the first diene elastomer.

According to a first variant of the first aspect, the SiOR function borne by the first diene elastomer may be a pendant group, which is equivalent to saying that the silicon atom of the SiOR function may not be inserted between the carbon-carbon bonds of the elastomer chain of the first diene elastomer. A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the first aspect, the SiOR function borne by the first diene elastomer may not be a pendant group, but maybe be situated in the elastomer chain, that is, may be within the elastomer chain, which is equivalent to saying that the silicon atom of the SiOR function may be inserted between the carbon-carbon bonds of the elastomer chain of the first diene elastomer. Such a diene elastomer may be prepared according to the procedure described in a patent EP 2 285 852. This second variant is preferential and applies to the first aspect.

A second aspect of the invention is the tire according to the first aspect, wherein the first diene elastomer is a styrene-butadiene copolymer (SBR), preferably a solution styrene-butadiene copolymer which is a copolymer of butadiene and styrene, prepared in solution.

A third aspect of the invention is the tire according to the first or the second aspect, wherein the first diene elastomer further bears at least one amine function, preferably at least one tertiary amine function.

According to a preferred embodiment of the third aspect, the amine function borne by the first diene elastomer may be a tertiary amine function. Mention will be made, as tertiary amine function, of the amines substituted with $C_1$-$C_{10}$ alkyl radicals, preferably $C_1$-$C_4$ alkyl, more preferably methyl or ethyl radical(s).

Generally, such a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

According to this embodiment or a preferred embodiment of the third aspect, the amine function borne by the first diene elastomer may be a pendant group. The pendant position of the amine function means, in a known way, that the nitrogen atom of the amine function may not be inserted between the carbon-carbon bonds of the elastomer chain of the first diene elastomer.

A fourth aspect of the invention is the tire according to the third aspect, wherein the SiOR function bears the amine function.

Such a diene elastomer may result from the modification of a diene elastomer by a coupling agent that introduces, the elastomer chain, an alkoxysilane group bearing an amine function according to the operating procedure described in a patent EP 2 285 852. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane being most particularly preferred, irrespective of the embodiment of the invention.

A fifth aspect of the invention is the tire according to any one of the first to the fourth aspects, wherein R of the SiOR function is a hydrocarbon radical.

According to a preferred embodiment of the fifth aspect, the hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

A sixth aspect of the invention is the tire according to any one of the first to the fifth aspects, wherein the first diene elastomer has a glass transition temperature ($Tg_{DSC}$) of lower than −40° C., (notably between −100° C. and −40° C.), advantageously less than −45° C. (notably between −90° C. and −45° C.).

A seventh aspect of the invention is the tire according to any one of the first to the sixth aspects, wherein the elastomer matrix comprises 30 to 60 phr, preferably 30 to 50 phr, more preferably 40 to 50 phr, of the first diene elastomer.

The second diene elastomer is a polyisoprene elastomer different from the first diene elastomer.

An eighth aspect of the invention is the tire according to any one of the first to the seventh aspects, wherein the elastomer matrix comprises 30 to 60 phr, preferably 30 to 50 phr, more preferably 40 to 50 phr, of the second diene elastomer.

According to a preferred embodiment of the invention, the second diene elastomer may be polyisoprene(s) selected from the group consisting of synthetic polyisoprenes (IRs), natural rubber (NR) and the mixtures thereof. The synthetic polyisoprene(s) may be synthetic cis-1,4-polyisoprene(s), preferably having a content (mol %) of cis-1,4-units of greater than 90%, more preferably of greater than 98%.

A ninth aspect of the invention is the tire according to any one of the first to the eighth aspects, wherein the second diene elastomer comprises more than 50% by weight, preferably 100% by weight, of natural rubber per 100% by weight of the second diene elastomer.

The third diene elastomer is diene elastomer(s) different from the first and the second diene elastomers.

A tenth aspect of the invention is the tire according to any one of the first to the ninth aspects, wherein the elastomer matrix comprises 5 to 20 phr, preferably 5 to 15 phr, of the third diene elastomer.

An eleventh aspect of the invention is the tire according to any one of the first to the tenth aspects, wherein the third diene elastomer is a polybutadiene.

According to a preferred embodiment of the eleventh aspect, the third diene elastomer is polybutadiene(s) having a content (molar %) of 1,2-units of between 4% and 80% or those having a content (molar %) of cis-1,4-units of greater than 80%, preferably greater than 90% (molar %), more preferably greater than or equal to 96% (molar %).

The rubber composition of the tire according to the invention is based on a reinforcing filler that predominantly comprises a reinforcing inorganic filler (for example, silica), that is, the content of reinforcing inorganic filler is more than 50% by weight, preferably more than 55% by weight, more preferably more than 60% by weight, per 100% by weight of the total reinforcing filler. The reinforcing filler can reinforce the rubber composition, and the reinforcing filler may further comprise a reinforcing organic filler (for example, carbon black).

A twelfth aspect of the invention is the tire according to any one of the first to the eleventh aspects, wherein the reinforcing filler comprises 10 to 70 phr.

According to a preferred embodiment of the twelfth aspect, the reinforcing filler comprises 10 to 60 phr, preferably 10 to 50 phr, of the reinforcing inorganic filler.

According to a preferred embodiment of the twelfth aspect, the reinforcing filler comprises 20 to 70 phr, preferably 20 to 60 phr, more preferably 20 to 50 phr, of the reinforcing inorganic filler.

According to a more preferred embodiment of the twelfth aspect, the reinforcing filler comprises 30 to 70 phr, preferably 30 to 60 phr, more preferably 30 to 50 phr, of the reinforcing inorganic filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

A thirteenth aspect of the invention is the tire according to any one of the first to the twelfth aspects, wherein the reinforcing inorganic filler comprises more than 50% by weight, preferably 100% by weight, of silica per 100% by weight of the reinforcing inorganic filler. The reinforcing inorganic filler of the reinforcing filler in the rubber composition may be based on a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

The reinforcing inorganic filler used, particularly in case of that it is silica, has a BET surface area and a CTAB specific surface area that are advantageously 50 to 350 $m^2/g$, more advantageously 100 to 300 $m^2/g$, still more preferably between 150 and 250 $m^2/g$.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

A fourteenth aspect of the invention is the tire according to any one of the first to the thirteenth aspects, wherein the reinforcing filler further comprises 10 to 40 phr, preferably 15 to 40 phr, more preferably 15 to 35 phr, still more preferably 20 to 30 phr, of carbon black.

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance).

According to one preferred embodiment of the invention, the total content of reinforcing filler may be 30 to 100 phr, preferably 40 to 90 phr, more preferably 30 to 80 phr, in order to make better balance between reinforcement and processability of the tire.

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

Z-A-Sx-A-Z, in which: (I)

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

[Chem. 1]

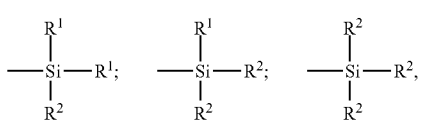

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3 Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in patent applications WO 02/30939 (or U.S. Pat. No. 6,774, 255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to one preferred embodiment of the invention, the content of coupling agent may be preferably from 0.5 to 15% by weight per 100% by weight of the reinforcing inorganic filler, particularly silica.

According to one preferred embodiment of the invention, the rubber composition of the tire according to the invention may be based on less than 10 phr (for example, between 0.1 and 10 phr), preferably less than 8 phr (for example, between 0.5 and 8 phr), more preferably less than 6 phr (for example, between 1 and 6 phr), of coupling agent.

The rubber compositions of the tires according to the invention may be based on all or a portion(s) of the usual additives generally used in the elastomer compositions for tires, such as, for example, protection agents, such as antiozone waxes, chemical antiozonants, antioxidants, plasticizing agent, tackifying resins, methylene acceptors (for example phenolic novolak resin) or methylene donors (for example HMT or H3M hexamethylenetetramine (HMT) or hexamethoxymethylmelamine (H3M)), a crosslinking system based either on sulphur or on donors of sulphur and/or peroxide and/or bismaleimides, vulcanization accelerators, or vulcanization activators.

A fifteenth aspect of the invention is the tire according to any one of the first to the fourteenth aspects, wherein the rubber composition is further based on a plasticizing agent, preferably selected from the group consisting of liquid plasticizer(s), hydrocarbon resin(s) and the mixtures thereof.

According to a preferred embodiment of the fifteenth aspect, the plasticizing agent comprises no liquid plasticizer or equal to or less than 20 phr, preferably equal to or less than 15 phr, the plasticizing agent comprises 0 to 20 phr, preferably 0 to 15 phr, more preferably between 0 and 15 phr, of the liquid plasticizer(s).

According to a preferred embodiment of the fifteenth aspect, the plasticizing agent comprises no liquid plasticizer or equal to or less than 30 phr, preferably equal to or less than 25 phr, that is, the plasticizing agent comprises 0 to 30 phr, preferably 0 to 25 phr, more preferably between 0 and 25 phr, still more preferably between 0 and 20 phr, of the liquid plasticizer(s).

Any extending oil, whether of aromatic or non-aromatic nature, any liquid plasticizing agent known for its plasticizing properties with regard to elastomer matrix(es), for instance, diene elastomers, can be used as the liquid plasticizer(s) to soften the matrix by diluting the elastomer and the reinforcing filler. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a preferred embodiment of the fifteenth aspect, the plasticizing agent comprises the liquid plasticizer(s) selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof, more preferably selected from the group consisting of MES oils, vegetable oils and the mixtures thereof, still more preferably selected from the group consisting of vegetable oils and the mixtures thereof. The vegetable oil(s) may be made of an oil selected from the group consisting of linseed, safflower, soybean, corn, cottonseed, turnip seed, castor, tung, pine, sunflower, palm, olive, coconut, groundnut and grapeseed oils, and the mixtures thereof, particularly sunflower oil(s), more particularly sunflower oil(s) containing over 60%, still more particularly over 70%, advantageously over 80%, more advantageously over 90%, still advantageously 100%, by weight of oleic acid.

According to a preferred embodiment of the fifteenth aspect, the plasticizing agent comprises no hydrocarbon resin or equal to or less than 30 phr, preferably equal to or less than 25 phr, that is, the plasticizing agent comprises 0 to 30 phr, preferably 0 to 25 phr, more preferably between 0 and 25 phr, still more preferably between 0 to 20 phr, of the hydrocarbon resin(s).

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:
 a $Tg_{DSC}$ of above 20° C. (for example, between 20° C. and 100° C.), preferably above 30° C. (for example, between 30° C. and 100° C.), more preferably above 40° C. (for example, between 40° C. and 100° C.), still more preferably above 45° C. (for example, between 45° C. and 100° C.), particularly at least 50° C. (for example, at least 50° C. and less than 100° C.);
 a number-average molecular weight (Mn) of between 400 and 2000 g/mol (more preferably between 500 and 1500 g/mol);
 a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a preferred embodiment of the fifteenth aspect, the plasticizing agent comprises the hydrocarbon resin(s) selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:

polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);

$C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";

limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

According to a preferred embodiment of the fifteenth aspect, the total content of plasticizing agent may be 0 to 30 phr, preferably 5 to 30 phr, more preferably 5 to 25 phr.

These compositions can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber compositions of the tires according to the invention may be manufactured in appropriate mixers using two successive preparation phases well known to a person skilled in the art: a first phase of thermomechanical working or kneading (referred to a as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

incorporating in the elastomer matrix, for instance, the diene elastomer(s), in a mixer, the reinforcing filler, during a first stage ("non productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a portion of a tire.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazolesulphenamide ("DCBS"), N-ter′t-butyl-2-benzothiazolesulphenamide ("TBBS"), N-tert-butyl-2 benzothiazolesulphenimide ("TBSI"), zinc dibenzyldithiocarbamate ("ZBEC"), Tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as a portion of a tire.

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The invention relates to the rubber compositions in the raw state (i.e., before curing) and in the cured state (i.e., after crosslinking or vulcanization).

A sixteenth aspect of the invention is the tire according to any one of the first to the fifteenth aspects, wherein the rubber composition is included in the tread of said tire.

A seventeenth aspect of the invention is the tire according to the sixteenth, wherein the rubber composition is included in a radially internal portion of the tread, the tread comprising in addition to said radially internal portion, a radially external portion made of a different rubber composition.

The tread may comprise at least two radially superposed portions which comprise the radially internal portion and the radially external portion.

According to a preferred embodiment of the seventeenth aspect, the internal portion is intended to come into contact with the ground at a latter during the service life of the tire.

According to another preferred embodiment of the seventeenth aspect, the internal portion is not intended to come into contact with the ground during the service life of the tire.

The service life of the tire is usually from the new state to the final state to reach wear bar in case of that the tire is intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

The invention is further illustrated by the following non-limiting examples.

EXAMPLE

In the test, two rubber compositions (identified as C-1 (a reference) and C-2 (an example according to the invention)) are compared. They are based on a blend of diene elastomers (SBR bearing a SiOR function, natural rubber as a polyisoprene, and polybutadiene) reinforced with a blend of silica (as a reinforcing inorganic filler) and carbon black. The formulations of the two rubber compositions are given at Table 1 with the content of the various products expressed in phr.
- C-1: based on SBR bearing a SiOR function located at the elastomer chain end (a reference);
- C-2: based on SBR bearing a SiOR function not located at the elastomer chain end, (an example according to the invention).

The reinforcing filler, its associated coupling agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached.

The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products.

As the measurement of tack, a test device based on the probe tack tester (ASTM D2979-95) was used. An Instron tensile test machine comprising a fixed metallic jaw and a mobile metallic jaw was used. A first test specimen was stuck on the fixed metallic jaw. A second test specimen was stuck to the mobile jaw. The test specimens were cut into circular plates with a 45 mm diameter punch. The test specimens were made of mixing films on which plastic films were put in order to reinforce the mixing films. The mixing films were obtained by calendaring the unvulcanized mixtures with a thickness of 2 mm.

The principle of the measurement consisted in bringing the two mixing films into contact for 5 seconds by applying a compression force of 20 N. After this contact phase, the two mixing films were separated by driving the cross-member of the tensile test machine. The speed of displacement of the cross-member in this peeling phase was 1 mm/s. The displacement of the cross-member and the force were measured continuously as a function of time from the contact phase to the peeling phase.

The measurement of tack was done with the mixing films obtained by calendaring the unvulcanized mixtures of the reference (C-1) and the example according to the invention (C-2).

Each result of tack is the measurement of the maximum force reached during the peeling. The results are expressed in base 100, that is to say that the value 100 is arbitrarily assigned to the reference (C-1), and then the tack value of the example according to the invention (C-2) is 116, that is, maximum force [C-2]/maximum force [C-1]×100. The higher the value is, the higher (stronger) the tack is.

Moreover, the dynamic properties of the vulcanized mixtures of the reference (C-1) and the example according to the invention (C-2) were measured on a viscosity analyser (Metravib VA4000), according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, was recorded. A strain amplitude sweep was carried out from 0.1% to 100% (outward cycle) and then from 100% to 1% (return cycle). The result made use of is the loss factor tan(δ) whose the maximum value, denoted tan(δ)$_{max}$, at 23° C., observed for the return cycle. It should be remembered that, in a way well known to a person skilled in the art, the value of tan(δ)$_{max}$ at 23° C. is representative of the hysteresis of the material and thus of the rolling resistance. The results are expressed in base 100, that is to say that the value 100 is arbitrarily assigned to the reference (C-1), and then the value of the example according to the invention (C-2) is 174, that is, tan(δ)$_{max}$[C-1]/tan(δ)$_{max}$[C-2]×100. The higher the value is, the lower the rolling resistance is.

In conclusion, the rubber composition of the tire according to the invention allows improvements of not only tack, but also rolling resistance of the tire.

TABLE 11

|  | C-1 | C-2 |
|---|---|---|
| SBR1 (1) | 45 |  |
| SBR2 (2) |  | 45 |
| NR (3) | 45 | 45 |
| BR (4) | 10 | 10 |
| Carbon black (5) | 25 | 25 |
| Silica (6) | 40 | 40 |
| Coupling agent (7) | 3.2 | 3.2 |
| Liquid plasticizer (8) | 5 | 5 |
| Hydrocarbon resin (9) | 15 | 15 |
| Resin-OPFT (10) | 3 | 3 |
| ZnO | 2 | 2 |
| Stearic acid | 1 | 1 |
| Antiozone wax | 1 | 1 |
| Antioxidant (11) | 2 | 2 |
| DPG (12) | 1 | 1 |
| Sulphur | 5 | 5 |
| Accelerator (13) | 2 | 2 |

(1) SBR1: Solution SBR with 27% of styrene unit and 24% of unit 1.2 of the butadiene part ($Tg_{DSC}$=−48° C.) bearing a SiOR function, R being a hydrogen atom, the SiOR being dimethylsilanol function at the end of the elastomer chain, the SBR prepared according to a process described in a patent EP 0 778 311;

(2) SBR2: Solution SBR with 27% of styrene unit and 24% of unit 1.2 of the butadiene part ($Tg_{DSC}$=−48° C.) bearing a SiOR function, R being a methyl radical, the SiOR function not located at the ends of the elastomer chain; wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852;

(3) NR: Natural rubber (peptised);

(4) BR: BR with 0.3% of 1,2 vinyl; 2.7% of trans; 97% of cis-1,4 ($Tg_{DSC}$=−105° C.);

(5) Carbon black: Carbon black (ASTM grade N234 from Cabot);

(6) Silica: Silica ("Zeosil 1165MP" from Rhodia (CTAB, BET: about 160 m²/g));

(7) Coupling agent TESPT ("Si69" from Evonik);

(8) Oleic sunflower oil ("Agripure 80" from Cargill, Weight percent oleic acid: 100%);

(9) Cycloaliphatic hydrocarbon resins ("ESCOREZ5600" from ExxonMobil, $Tg_{DSC}$=52° C.);

(10) Octyl-substituted phenol-formaldehyde resin;

(11) N-(1,3-dimethylbutyl)-N-phenyl-para-phenylenediamine ("Santoflex 6-PPD" from Flexsys);

(12) Diphenylguanidine ("Perkacit DPG" from Flexsys);

(13) N-dicyclohexyl-2-benzothiazolesulphenamide ("Santocure CBS" from Flexsys).

The invention claimed is:

1. A tire comprising a rubber composition based on at least:
   an elastomer matrix comprising 30 to 50 phr of a first diene elastomer bearing at least one SiOR function, R being a hydrogen atom or a hydrocarbon radical, the SiOR function not located at the chain ends of the first diene elastomer, 40 to 50 phr of a second diene elastomer which is a polyisoprene, and 5 to 20 phr of a third diene elastomer; and
   a reinforcing filler predominantly comprising a reinforcing inorganic filler.

2. The tire according to claim 1, wherein the first diene elastomer is a styrene-butadiene copolymer.

3. The tire according to claim 1, wherein the first diene elastomer further bears at least one amine function.

4. The tire according to claim 3, wherein the SiOR function bears the amine function.

5. The tire according to claim 1, wherein R of the SiOR function is a hydrocarbon radical.

6. The tire according to claim 1, wherein the first diene elastomer has a glass transition temperature of lower than −40° C.

7. The tire according to claim 1, wherein the second diene elastomer comprises more than 50% by weight of natural rubber per 100% by weight of the second diene elastomer.

8. The tire according to claim 1, wherein the third diene elastomer is a polybutadiene.

9. The tire according to claim 1, wherein the reinforcing filler comprises 10 to 70 phr of the reinforcing inorganic filler.

10. The tire according to claim 1, wherein the reinforcing inorganic filler comprises more than 50% by weight of silica per 100% by weight of the reinforcing inorganic filler.

11. The tire according to claim 1, wherein the reinforcing filler further comprises 10 to 40 phr of carbon black.

12. The tire according to claim 1, wherein the rubber composition is further based on a plasticizing agent.

13. The tire according to claim 1, wherein the rubber composition is included in the tread of the tire.

14. The tire according to claim 13, wherein the rubber composition is included in a radially internal portion of the tread, the tread comprising in addition to said radially internal portion, a radially external portion made of a different rubber composition.

* * * * *